United States Patent [19]

Wan et al.

[11] Patent Number: 5,194,514
[45] Date of Patent: Mar. 16, 1993

US005194514A

[54] MICROWAVE TREATMENT OF POLYMER

[75] Inventors: Jeffrey K. Wan; Mary C. Depwe; Howard C. Ng, all of Kingston, Canada

[73] Assignee: Du Pont Canada Inc., Mississauga, Canada

[21] Appl. No.: 565,125

[22] Filed: Aug. 10, 1990

[51] Int. Cl.⁵ .............................................. C08F 8/00
[52] U.S. Cl. .................................. 525/371; 525/333.7; 525/420
[58] Field of Search ................................ 525/420, 371

[56] References Cited

U.S. PATENT DOCUMENTS 4,069,184  1/1978  Ferraro et al. ................. 525/420
4,963,627  10/1990  Smyser et al. .................. 525/420

FOREIGN PATENT DOCUMENTS 1534151  1/1975  United Kingdom .

Primary Examiner—Bernard Lipman

[57] ABSTRACT

A process for increasing the molecular weight of a polymer, comprising subjecting said polymer to electromagnetic radiation in the presence of a paramagnetic metallic catalyst for a sufficient period of time to significantly increase the molecular weight of the polymer, said polymer being either in solution or in a molten state and said radiation having a frequency in the range of about 0.9 to 10 GHz. The preferred paramagnetic catalysts are metallic nickel, iron or cobalt. The preferred polymers are polyamides and polyolefins.

5 Claims, No Drawings

MICROWAVE TREATMENT OF POLYMER

BACKGROUND OF THE INVENTION

The present invention relates to a method for increasing the molecular weight of a polymer.

The molecular weight of polymers may be increased for a number of reasons. For instance, in some processes lower molecular weight polymer may be more readily processed in the melt phase, but the resultant products may exhibit deficiencies in properties due to the low molecular weight. In such situations, it may be possible to process the polymer using the lower molecular weight, and to subsequently increase the molecular weight of the polymer e.g. by cross-linking the polymer. In other instances, several processes may be operated from a single source of polymer but one of the processes may require a higher molecular weight polymer than the other processes. It may also be desireable to increase polymer molecular weight because the process for manufacturing the polymer provides a lower molecular weight polymer than is desired or because the polymer that is available commercially is of lower molecular weight than is required.

A variety of methods are known for increasing the molecular weight of polymers, including subjecting the polymer to cross-linking processes. For example, polyolefins may be cross-linked by admixing the polymer with an organic peroxide and then melt extruding the polymer or by admixing the polymer with a vinyl silane, extruding the polymer and then subjecting the polymer to moisture. Condensation polymers such as polyamide may be cross-linked by heating the polymer in the presence of a catalyst, such as ammonium or metal hypophosphite, phosphoric acid, triphenyl phosphite and p-toluenesulphonic acid, and removing water.

It is desired to provide a process to increase the molecular weight of polymer in an efficient manner.

SUMMARY OF THE INVENTION

Accordingly the present invention provides a method for increasing the molecular weight of a polymer, comprising subjecting said polymer to electromagnetic radiation in the presence of a paramagnetic metallic catalyst for a sufficient period of time to significantly increase the molecular weight of the polymer, said polymer being either in solution or in a molten state and said radiation having a frequency in the range of about 0.9 to 10 GHz.

DESCRIPTION OF THE PREFERRED EMBODIMENTS

In a preferred embodiment of the invention, the polymer has at least one unsubstituted methylene group in the repeating unit thereof. Preferably the polymer is either a polyolefin or a polyamide.

Polyolefins suitable for use in the present invention may be formed by polymerization of one or more alpha-olefins having 2 to 10 carbon atoms. Examples of such polyolefins include homopolymers of ethylene and propylene, or copolymers thereof, and copolymers of ethylene with at least one $C_4$-$C_{10}$ higher alpha-olefin. Such polymers may be formed by the polymerization of alpha-olefins using coordination catalysts or, for example for some homopolymers of ethylene, using free-radical catalysts. Many examples of such polymers are known in the art and are available commercially. The polymers are available with a wide variety of properties, including a wide variety of densities and molecular weights.

Suitable polyamides include the polyamides formed by the condensation polymerization of an aromatic or aliphatic dicarboxylic acid having 6–12 carbon atoms with an aliphatic primary diamine having 6–12 carbon atoms. Alternatively, the polyamide may be formed by condensation polymerization of an aliphatic lactam or alpha, omega aminocarboxylic acid having 6–12 carbon atoms. In addition, the polyamide may be formed by copolymerization of mixtures of such dicarboxylic acids, diamines, lactams and aminocarboxylic acids. Examples of dicarboxylic acids are 1,6-hexanedioic acid (adipic acid), 1,7-heptanedioic acid (pimelic acid), 1,8-octanedioic acid (suberic acid), 1,9-nonanedioic acid (azelaic acid), 1,10-decanedioic acid (sebacic acid), 1,12-dodecanedioic acid and terephthalic acid. Examples of diamines are 1,6-hexamethylene diamine, 1,8-octamethylene diamine, 1,10-decamethylene diamine and 1,12-dodecamethylene diamine. An example of a lactam is caprolactam. Examples of alpha,omega aminocarboxylic acids are amino octanedioic acid, amino decanedioic acid, amino undecanedioic acid and amino dodecanedioic acid. Preferred examples of the polyamides are polyhexamethylene adipamide and polycaprolactam, which are also known as nylon 66 and nylon 6, respectively.

The polymer may be used in the method of the present invention at a temperature above its melting point i.e. in a molten form. Alternatively, the polymer may be dissolved in a suitable solvent and then subjected to the method of the present invention. Examples of solvents for polyolefins include hydrocarbon solvents, e.g. cyclohexane, hexane, pentane and the like. Examples of solvents for polyamides include formic acid. A range of polymer concentrations may be used, but it is preferred that the concentration of polymer in solution be as high as is practical for operation of the process, especially of transfer of the solution through apparatus used in the process. Similarly, the melt viscosity of molten polymer should be such as to permit transfer of the polymer through the apparatus, which may impose requirements on e.g. the temperature of operation of the process, or restrict the molecular weights of the polymers that may be used.

The catalyst used in the method of the present invention is a paramagnetic metallic catalyst. Examples of such catalysts are nickel, iron and cobalt. In a preferred embodiment the catalyst is either supported on a solid support, is in the form of a catalyst bed or is in the form of a mesh. The catalyst may be admixed with the polymer, but this would require separation of catalyst and polymer after treatment by a magnetic separator or the like.

The polymer is subjected to electromagnetic radiation having a frequency in the range of about 0.9 to 10 GHz, which is the broad frequency range for microwave radiation. The frequency range of the present invention is most preferably 2 to 5 GHz. The microwave power is preferably about 2 kWatts on average. The period of time of exposure of polymer to the radiation should be sufficient to achieve the desired increase in molecular weight. For example, to achieve a molecular weight increase of nylon 6,6 of at least 15%, the polymer must be exposed to radiation for a period of time of at least four seconds. Preferably the total exposure time is from 4 to 600 seconds, and most preferably from 4 to 120 seconds.

The present invention may be operated batchwise or continuously. In a preferred embodiment, the process is carried out by passing polymer in a fluid state continuously through a packed bed of catalyst while simultaneously subjecting it to microwave radiation. The polymer may be passed through the bed and subjected to radiation several times to expose the polymer to radiation for a sufficient total period of time to achieve the desired molecular weight increase.

The present invention is illustrated by the following examples:

EXAMPLE 1

The apparatus used was comprised of a Pyrex Å reactor having a volume of 50 ml that was adapted to circulate polymer through a packed bed of catalyst and back to a reservoir. The packed bed of catalyst was adapted to be subjected to microwave radiation. The radiation used was applied in pulses for lengths of 100 to 360 milliseconds at a frequency of 0.1 Hz. The radiation time is calculated by multiplying the number of pulses by the length of each pulse. The frequency of the radiation was 2.4 GHz and the power of radiation was an average of 2 kW. The catalyst was a commercially available nickel catalyst viz. Ni-1404; such a catalyst is available from Harshaw/Filtral Partnership, Ohio, U.S.A. in the form of spheres of metal deposited on ceramics and having a diameter of 2 mm.

Solutions of polyhexamethylene adipamide in formic acid were continuously flowed through the reactor at a rate of 4 ml/min.

Further experimental details and the results obtained were as follows:

TABLE I

| Run No. | Polyamide Conc. (wt. %) | Radiation Time (sec) | Relative Viscosity* |
|---|---|---|---|
| 1 | 8.4 | 0 | 40.5 |
| 2 | 8.4 | 8.5 | 42.7 |
| 3 | 8.4 | 36 | 45.6 |
| 4 | 10 | 0 | 73.36 |
| 5 | 10 | 9.6 | 74.36 |
| 6 | 10 | 36 | 80.91 |

*Relative Viscosity (RV) was measured by the procedure of ASTM D789-86, using formic acid as solvent
N.B. Runs 1 and 4 are comparative runs These results show that treatment of the polyamide solution with microwave radiation resulted in an increase in molecular weight, as measured by relative viscosity (RV).

EXAMPLE II

The procedure of Example I was repeated using two different methods of irradiation. In one method, the microwave radiation was a focused microwave beam that passed through a waveguide; the radiation in this instance had a frequency of 2.4 GHz. In the other method, the microwave radiation was from a modified domestic-style microwave oven; the radiation in this instance also had a frequency of 2.4 GHz.

Solutions of polyhexamethylene adipamide in formic acid were continuously flowed through the reactor at a rate of 4 ml/min. The solution contained 8.4% by weight of polyhexamethylene adipamide in formic acid. The catalyst was used in the form of a powder or a mesh of commercially available nickel.

Further experimental details and the results obtained were as follows:

TABLE I

| Run No. | Catalyst Type | Radiation Type | Radiation Time (sec) | Relative Viscosity* |
|---|---|---|---|---|
| 7 | — | — | 0 | 40.45 |
| 8 | — | oven | 43.2 | 38.99 |
| 9 | powder | oven | 43.2 | 43.62 |
| 10 | mesh | oven | 43.2 | 42.60 |
| 11 | — | waveguide | 4.2 | 40.33 |
| 12 | powder | waveguide | 4.2 | 41.94 |

*Relative Viscosity (RV) was measured by the procedure of ASTM D789-86 using formic acid as solvent
N.B. Runs 7, 8 and 11 are comparative runs These results show that treatment of the polyamide solution with microwave radiation resulted in an increase in molecular weight, as measured by relative viscosity (RV), using microwave radiation from both the waveguide reactor and domestic oven.

We claim:

1. A process for increasing the molecular weight of a polyamide or polyolefin polymer having at least one unsubstituted methylene group in the repeating unit thereof, comprising subjecting said polymer to electromagnetic radiation in the presence of a paramagnetic metallic catalyst selected from the group consisting of nickel, iron, and cobalt for a sufficient period of time to increase the molecular weight of the polymer by at least 15%, said polymer being either in solution or in a molten state and said radiation having a frequency in the range of about 0.9 to 10 GHz.

2. The process of claim 1 wherein the polymer is selected from homopolymers of ethylene or propylene, and copolymers of ethylene or propylene.

3. The process of claim 1 wherein the polymer is selected from polyhexamethylene adipamide and polycaprolactam.

4. The process of claim 1 wherein said polymer is subjected to electromagnetic radiation having a frequency in the range of about 2 to 5 GHz.

5. The process of claim 1 wherein said polymer is subjected to radiation for at least 4 seconds.

* * * * *